(12) United States Patent
Zimmermann et al.

(10) Patent No.: US 7,588,697 B2
(45) Date of Patent: Sep. 15, 2009

(54) COATED SODIUM PERCARBONATE GRANULES WITH IMPROVED STORAGE STABILITY

(75) Inventors: Klaus Zimmermann, Rodenbach (DE); Jürgen Lattich, Nidderau (DE); Harald Jakob, Hasselroth (DE)

(73) Assignee: Evonik Degussa GmbH, Essen (DE)

( * ) Notice: Subject to any disclaimer, the term of this patent is extended or adjusted under 35 U.S.C. 154(b) by 641 days.

(21) Appl. No.: 10/555,546

(22) PCT Filed: Apr. 24, 2004

(86) PCT No.: PCT/EP2004/004355

§ 371 (c)(1),
(2), (4) Date: Nov. 4, 2005

(87) PCT Pub. No.: WO2004/099071

PCT Pub. Date: Nov. 18, 2004

(65) Prior Publication Data

US 2006/0249707 A1   Nov. 9, 2006

(30) Foreign Application Priority Data

May 7, 2003   (EP) .................................. 03010225

(51) Int. Cl.
*C01B 15/10* (2006.01)
*C11D 3/39* (2006.01)

(52) U.S. Cl. .............................. 252/186.27; 252/186.25; 252/186.43; 423/425.2; 510/309; 510/367

(58) Field of Classification Search ............. 252/186.27
See application file for complete search history.

(56) References Cited

U.S. PATENT DOCUMENTS

| | | | |
|---|---|---|---|
| 3,830,738 A | | 8/1974 | Cottrell |
| 3,860,694 A | * | 1/1975 | Jayawant ..................... 423/307 |
| 3,951,838 A | | 4/1976 | Jayawant et al. |
| 4,025,609 A | * | 5/1977 | Matsunaga ................ 423/415.2 |
| 4,105,827 A | | 8/1978 | Brichard et al. |
| 4,215,990 A | | 8/1980 | Barrett, Jr. et al. |
| 4,325,933 A | | 4/1982 | Matsumoto et al. |
| 4,409,197 A | * | 10/1983 | Sugano et al. ............ 423/415.2 |
| 4,428,914 A | * | 1/1984 | Brichard et al. .............. 423/265 |
| 4,526,698 A | | 7/1985 | Kuroda et al. |
| 4,748,488 A | | 5/1988 | Suzuki et al. |
| 4,788,052 A | | 11/1988 | Ng et al. |
| 4,839,157 A | | 6/1989 | Mei-King Ng et al. |
| 5,122,518 A | | 6/1992 | Vrba et al. |
| 5,149,643 A | * | 9/1992 | Mothes et al. ............... 435/144 |
| 5,332,518 A | | 7/1994 | Kuroda et al. |
| 5,374,368 A | | 12/1994 | Hauschild |
| 5,380,456 A | | 1/1995 | Woods |
| 5,462,804 A | * | 10/1995 | Kokubu et al. ......... 428/402.24 |
| 5,478,488 A | | 12/1995 | Doetsch et al. |
| 5,496,542 A | | 3/1996 | Hauschild |
| 5,505,875 A | | 4/1996 | Beaujean et al. |
| 5,560,896 A | * | 10/1996 | Bewersdorf et al. ....... 423/415.2 |
| 5,653,781 A | * | 8/1997 | Kayaert et al. .................. 71/28 |
| 5,674,436 A | | 10/1997 | Breitenbach et al. |
| 5,691,296 A | | 11/1997 | Agar et al. |
| 5,695,679 A | | 12/1997 | Christie et al. |
| 5,785,934 A | | 7/1998 | Jacobs et al. |
| 5,792,738 A | | 8/1998 | Baillely et al. |
| 5,814,592 A | | 9/1998 | Kahn et al. |
| 5,833,361 A | * | 11/1998 | Funk ........................... 366/80 |
| 5,840,358 A | * | 11/1998 | Hofler et al. ................. 426/467 |
| 5,902,682 A | * | 5/1999 | Bertsch-Frank et al. ..... 428/403 |
| 5,902,783 A | * | 5/1999 | Lagnemo et al. ............ 510/375 |
| 5,906,660 A | | 5/1999 | Pardini et al. |
| 5,935,708 A | * | 8/1999 | Schuette et al. ............. 428/403 |
| 5,965,505 A | | 10/1999 | Baillely et al. |
| 6,017,867 A | | 1/2000 | Baillely |
| 6,121,502 A | | 9/2000 | Tembe et al. |
| 6,165,959 A | | 12/2000 | Meyer et al. |
| 6,194,368 B1 | | 2/2001 | Waschenbach et al. |

(Continued)

FOREIGN PATENT DOCUMENTS

AU   B-31754/95   4/1996

(Continued)

OTHER PUBLICATIONS

International Search Report dated Jul. 19, 2004.

(Continued)

*Primary Examiner*—Joseph D Anthony
(74) *Attorney, Agent, or Firm*—Michael A. Sanzo; Law Office of Michael A. Sanzo, LLC

(57) ABSTRACT

The invention concerns coated sodium percarbonate granules comprising a core produced by fluidized bed spray granulation, containing sodium percarbonate as its main component, an inner coating layer containing an organic, hydrate-forming salt as its main component, and an outer coating layer containing as its main component at least one surfactant containing in the molecule one or more sulfate or sulfonate groups in the form of an alkali metal, alkaline-earth metal or ammonium salt. The invention also concerns a process for the production of the granules, the use of the granules in bleaching and cleaning agents, and bleaching and cleaning agents containing the granules. The sodium percarbonate granules according to the invention display improved storage stability combined with high internal stability and a high active oxygen content.

25 Claims, No Drawings

U.S. PATENT DOCUMENTS

| | | | |
|---|---|---|---|
| 6,218,352 B1 * | 4/2001 | Lee et al. .................. 510/375 |
| 6,239,095 B1 | 5/2001 | Bertsch-Frank et al. |
| 6,267,934 B1 | 7/2001 | Pardini et al. |
| 6,290,775 B1 | 9/2001 | Kohlen et al. |
| 6,299,773 B1 | 10/2001 | Takamura et al. |
| 6,387,861 B1 | 5/2002 | Van Asperen et al. |
| 6,521,583 B1 * | 2/2003 | James et al. ............... 510/375 |
| 6,602,837 B1 | 8/2003 | Patel |
| 6,734,155 B1 | 5/2004 | Herbots et al. |
| 7,435,714 B2 | 10/2008 | Kottke et al. |
| 2002/0041843 A1 | 4/2002 | Jakob et al. |
| 2003/0104967 A1 * | 6/2003 | Jakob et al. ................ 510/444 |
| 2003/0160209 A1 | 8/2003 | Hoffman et al. |
| 2005/0239681 A1 | 10/2005 | Speckmann et al. |
| 2006/0014658 A1 | 1/2006 | Zimmermann et al. |
| 2006/0249707 A1 | 11/2006 | Zimmermann et al. |
| 2007/0055009 A1 | 3/2007 | Hasenzahl et al. |

FOREIGN PATENT DOCUMENTS

| | | |
|---|---|---|
| CA | 2170599 | 3/1995 |
| CA | 2326560 | 5/2001 |
| CA | 2 511 022 | 7/2004 |
| DE | 870 092 | 3/1953 |
| DE | 962 251 | 4/1957 |
| DE | 2 013 763 | 10/1971 |
| EP | 0 367 934 | 5/1990 |
| EP | 0 623 553 A1 | 11/1994 |
| EP | 0 634 478 A1 | 1/1995 |
| EP | 0 672 749 | 9/1995 |
| EP | 0 703 190 | 3/1996 |
| EP | 0 722 992 | 7/1996 |
| EP | 0 737 738 A2 | 10/1996 |
| EP | 0 962 424 | 12/1999 |
| EP | 0 970 917 | 1/2000 |
| EP | 0 992 575 A1 | 4/2000 |
| EP | 1 386 599 | 2/2004 |
| GB | 174891 | 1/1922 |
| GB | 1 303 810 | 1/1973 |
| GB | 1 466 799 | 3/1977 |
| JP | 06-263 434 | 9/1994 |
| WO | WO 92/07057 | 4/1992 |
| WO | WO 95/02555 | 1/1995 |
| WO | WO 95/02724 | 1/1995 |
| WO | WO 95/06615 | 3/1995 |
| WO | WO 96/06801 | 3/1996 |
| WO | WO 96/14388 | 5/1996 |
| WO | WO 97/19890 | 6/1997 |
| WO | WO 97/43211 | 11/1997 |
| WO | WO 97/45524 | 12/1997 |
| WO | WO 00/71666 A1 | 11/2000 |
| WO | WO 01/34759 | 5/2001 |
| WO | WO 01/66685 A1 | 9/2001 |
| WO | WO 01/80645 | 11/2001 |
| WO | WO 02/057402 A1 | 7/2002 |
| WO | WO 2004/056954 A1 | 7/2004 |
| WO | WO 2004/056955 A1 | 7/2004 |

OTHER PUBLICATIONS

European Search Report dated Oct. 9, 2003.
Written Opinion of the International Searching Authority for PCT/EP2004/004355 filed Apr. 24, 2004.
International Preliminary Report on Patentability for PCT/EP2004/004355 filed Apr. 24, 2004.
English language translation of reference WO 96/06801, (1996).

* cited by examiner

COATED SODIUM PERCARBONATE GRANULES WITH IMPROVED STORAGE STABILITY

CROSS REFERENCE TO RELATED APPLICATIONS

The present application represents U.S. national stage of international application PCT/EP2004/004355, which had an international filling date of Apr. 24, 2004, and which was published in English under PCT Article 21(2) on Nov. 18, 2004. The international application claims priority to European application 03 010 225.5, filed on May 7, 2003.

FIELD OF THE INVENTION

The invention concerns coated sodium percarbonate granules with improved storage stability and a process for the production of these sodium percarbonate granules.

BACKGROUND OF THE INVENTION

Sodium percarbonate is used as a bleaching agent and as an active bleaching component in detergents and cleaning agents. The disadvantage of sodium percarbonate here is that it tends to decompose in contact with moisture and with components of the detergent and cleaning agent compositions, leading to a loss in active oxygen and hence in bleaching action. In these applications sodium percarbonate is therefore preferably used in the form of granules coated with a stabilising coating layer in order to achieve improved storage stability in detergents and cleaning agents.

It is known from EP-A 0 863 842 that sodium percarbonate granules with improved storage stability can be produced by applying a firmly adhering coating layer, consisting substantially of sodium sulfate, to a core of sodium percarbonate produced by fluidised bed spray granulation.

WO 96/06801 describes coated sodium percarbonate granules having improved stability that are synthesised from a core of sodium percarbonate granules, an inner coating layer containing a sulfate or silicate and an outer coating layer containing a compound (B) selected from salts of monocarboxylic and dicarboxylic acids having 4 or more carbon atoms and a compound (C) selected from salts of sulfated oils, α-olefin sulfonic acids and monoalkyl and dialkyl sulfosuccinates. The examples given in the specification show that the presence of compounds (B) is necessary to achieve an adequate storage stability and that granules containing only compound (C) and no compound (B) in the outer layer display unsatisfactory storage stability.

JP-A 06-263434 describes stable in storage sodium percarbonate granules that are synthesised from surfactant-containing sodium percarbonate granules as the core, an inner coating layer consisting of a sulfate and an outer coating layer consisting of an anionic surfactant. Here the core material is produced by crystallisation and subsequent granulation with addition of the surfactant. From the examples and comparative examples given in the specification it follows that the core material must be produced with addition of a surfactant in order for the coated sodium percarbonate obtained to display an adequate storage stability and that granules with a surfactant-free sodium percarbonate core, an inner coating layer consisting of a sulfate and an outer coating layer consisting of an anionic surfactant display insufficient storage stability.

In the case of the sodium percarbonate granules described in EP-A 0 863 842 there is still a need for an improvement in storage stability. The sodium percarbonate granules described in WO 96/06801 have the disadvantage that they are complicated to produce, since at least three different compounds are necessary for coating the sodium percarbonate granules.

The sodium percarbonate granules described in JP-A 06-263434 have the disadvantage that with the surfactant they contain an organic compound in the sodium percarbonate core. This has a disadvantageous effect on the internal stability of the sodium percarbonate granules and leads to restrictions in the storage of large amounts of the granules in silos. For storage in silos the sodium percarbonate granules must display high internal stability, in other words low heat release during storage, since otherwise decomposition of the sodium percarbonate granules can occur in the silo due to self-accelerating heating.

DESCRIPTION OF THE INVENTION

The object of the invention was therefore to provide coated sodium percarbonate granules having improved storage stability, which can be produced by simple means and which combine the properties of high storage stability in detergent and cleaning agent compositions and high internal stability for storage in silos.

Surprisingly it was found that this object can be achieved by coated sodium percarbonate granules comprising
a) a core produced by fluidised bed spray granulation, containing sodium percarbonate as its main component,
b) an inner coating layer containing an inorganic, hydrate-forming salt as its main component and
c) an outer coating layer containing as its main component at least one surfactant containing in the molecule one or more sulfate or sulfonate groups in the form of an alkali metal, alkaline-earth metal or ammonium salt.

The invention also includes a process for the production of coated sodium percarbonate granules with improved storage stability, comprising the following steps:
a) production of a core material by fluidised bed spray granulation, wherein an aqueous hydrogen peroxide solution and an aqueous soda solution are sprayed into a fluidised bed comprising sodium percarbonate particles,
b) application of an inner coating layer onto the core material from step a) by spraying an aqueous solution in which at least one hydrate-forming inorganic salt is dissolved and
c) application of an outer coating layer onto the coated material from step b) by spraying an aqueous mixture in which at least one surfactant is dissolved or emulsified, which contains in the molecule one or more sulfate or sulfonate groups in the form of an alkali metal, alkaline-earth metal or ammonium salt.

The invention furthermore relates to the use of the sodium percarbonate granules according to the invention as bleaching agents or as active bleaching components in detergent and cleaning agents, and to bleaching agents and detergents and cleaning agents containing the sodium percarbonate granules according to the invention.

The sodium percarbonate granules according to the invention comprise a core produced by fluidised bed spray granulation, containing sodium percarbonate as its main component. Production of the core material takes place by known means by fluidised bed spray granulation, wherein an aqueous hydrogen peroxide solution and an aqueous sodium carbonate solution are sprayed into a fluidised bed containing nuclei whose dimensions are smaller than the particles of the core material to be produced and wherein water is evaporated at the same time. Sodium percarbonate is preferably used as the nucleus material. The core material is preferably produced by the method described in EP-A 0 716 640.

The proportion of core material in the coated sodium percarbonate granules according to the invention is preferably in the range from 80 to 99.5 wt. %, particularly preferably in the range from 90 to 99 wt. % and in particular in the range from 92 to 98 wt. %. The proportion of sodium percarbonate in the core of the sodium percarbonate granules according to the invention is preferably more than 80 wt. %, particularly preferably more than 95 wt. % and in particular more than 98 wt. %. The proportion of organic carbon compounds in the core is preferably less than 1 wt. %, particularly preferably less than 0.1 wt. % and in particular less than 0.01 wt. %.

In a preferred embodiment the core contains small amounts of additives, which have a stabilising effect on the active oxygen content, the proportion of stabilising additives in the core being preferably less than 2 wt. %. Magnesium salts, water glass, stannates, pyrophosphates, polyphosphates and chelating agents from the series comprising hydroxycarboxylic acids, aminocarboxylic acids, aminophosphonic acids, phosphonocarboxylic acids and hydroxyphosphonic acids, as well as alkali metal, ammonium or magnesium salts thereof, are preferably used as stability-increasing additives. In a particularly preferred embodiment the core contains as stabilising additive an alkali metal silicate, preferably water glass, having a $SiO_2/Na_2O$ modulus in the range from 1 to 3, in a quantity from 0.1 to 1 wt. %. In the most preferred embodiment the core also contains in addition to this amount of alkali metal silicate a magnesium compound in a quantity of 50 to 2000 ppm $Mg^{2+}$.

The coated sodium percarbonate granules according to the invention also include in addition to the core of sodium percarbonate an inner coating layer containing an inorganic, hydrate-forming salt as its main component and an outer coating layer containing as its main component at least one surfactant displaying in the molecule one or more sulfate or sulfonate groups in the form of an alkali metal, alkaline-earth metal or ammonium salt. In addition to this inner and outer coating layer, the sodium percarbonate granules according to the invention can also contain one or more additional coating layers, these being able to be positioned both between the core and the inner coating layer and between the inner and the outer coating layer and outside the outer coating layer.

Between the coating layers and between the innermost coating layer and the core there can be a clear boundary, at which the composition changes abruptly. Generally, however, a transition zone will form between the individual coating layers and between the innermost coating layer and the core, which contains the components from both adjoining layers. Such transition zones are formed for example by the application of a coating layer in the form of an aqueous solution, whereby as the layer starts to form, part of the layer beneath it is partially dissolved, such that a transition zone forms that contains the components of both layers. In this way, between the core and the inner coating layer a transition layer can form which contains sodium percarbonate, sodium carbonate, sodium hydrogen carbonate and the inorganic hydrate-forming salt from the inner coating layer. Similarly, between the inner coating layer and the outer coating layer a transition layer can form which contains the inorganic hydrate-forming salt from the inner coating layer and the surfactant from the outer coating layer.

The inner coating layer and outer coating layer are preferably formed in such a way that they cover the underlying material by more than 95%, preferably more than 98% and in particular completely.

The inner coating layer of the coated sodium percarbonate granules according to the invention contains an inorganic, hydrate-forming salt as its main component. The proportion of inner coating layer in the coated sodium percarbonate granules according to the invention is preferably in the range from 1 to 10 wt. %, particularly preferably in the range from 2 to 7 wt. %. The proportion of inorganic, hydrate-forming salt in the material of the inner coating layer is preferably at least 50 wt. %, particularly preferably at least 90 wt. %. The inorganic, hydrate-forming salt of the inner coating layer is preferably chosen from the series comprising sodium sulfate, sodium carbonate, sodium hydrogen carbonate or magnesium sulfate. Mixtures and mixed salts of these compounds are also suitable. The inner coating layer particularly preferably contains sodium sulfate as the inorganic hydrate-forming salt.

The outer coating layer of the coated sodium percarbonate granules according to the invention contains as its main component at least one surfactant containing in the molecule one or more sulfate or sulfonate groups in the form of an alkali metal, alkaline-earth metal or ammonium salt. The proportion of outer coating layer in the coated sodium percarbonate granules according to the invention is preferably in the range from 0.1 to 10 wt. %, particularly preferably 0.5 to 5 wt. % and in particular 1 to 3 wt. %. The proportion of surfactant in the material of the outer coating layer is preferably at least 50 wt. % and particularly preferably at least 80 wt. %. In a preferred embodiment the outer coating layer contains a mixture of surfactants, the surfactant mixture consisting of more than 50 wt. % of surfactants that contain in the molecule one or more sulfate or sulfonate groups in the form of an alkali metal, alkaline-earth metal or ammonium salt. The sulfate or sulfonate groups in the surfactant in the outer coating layer are particularly preferably in the form of an alkali metal salt, most preferably in the form of the sodium salt.

In the outer coating layer alkyl benzene sulfonates, alkane sulfonates, α-olefin sulfonates, α-sulfo fatty acid esters or sulfosuccinates are preferably used as surfactants having sulfonate groups. As alkyl benzene sulfonates, preferably those a straight-chain or branched alkyl group with preferably 8 to 20 carbon atoms, particularly 10 to 16 carbon atoms, are used. Preferred alkane sulfonates are examples having straight-chain alkyl chains with 12 to 18 carbon atoms. As α-olefin sulfonates, the reaction products from the sulfonation of α-olefins having 12 to 18 carbon atoms are preferably used. As α-sulfo fatty acid esters, sulfonation products of fatty acid esters produced from fatty acids having 12 to 18 carbon atoms and short-chain alcohols having 1 to 3 carbon atoms are preferred.

Alkyl sulfates and ether sulfates are preferably used as surfactants having a sulfate group in the molecule. Preferred alkyl sulfates are examples having straight-chain alkyl radicals with 12 to 18 carbon atoms. Preferred ether sulfates are the alkyl ether sulfates obtained by ethoxylation of linear alcohols having 12 to 18 carbon atoms with 2 to 6 ethylene oxide units, followed by sulfation.

In addition to the surfactants having sulfate or sulfonate groups, the outer coating layer can also contain other anionic surfactants as well as non-ionic surfactants, cationic surfactants and amphoteric surfactants.

In a further embodiment of the invention, corresponding to DE 102 61 161, the coated sodium percarbonate granules display an additional coating layer on top of the inner coating layer which contains as its main component an alkali metal silicate having a modulus of $SiO_2$ to alkali metal oxide of over 2.5. The additional coating layer can either be between the inner and the outer coating layer or be positioned on top of the outer coating layer. The proportion of additional coating layer in the coated sodium percarbonate granules according to the invention is preferably in the range from 0.2 to 3 wt. %. The proportion of alkali metal silicate in the material of the additional coating layer is preferably more than 50 wt. % and particularly preferably more than 80 wt. %. Sodium water glass is preferably used as the alkali metal silicate in the additional coating layer.

The sodium percarbonate granules according to the invention preferably display an average particle diameter in the range from 0.3 to 2 mm, particularly preferably in the range from 0.5 to 1 mm. The sodium percarbonate granules according to the invention preferably contain only a small proportion of fine particles. More than 90% of the particles in the sodium percarbonate according to the invention preferably display a diameter of over 0.2 mm.

The invention also concerns a process for the production of coated sodium percarbonate granules with improved storage stability, which comprises the following steps:

a) production of a core material by fluidised bed spray granulation, wherein an aqueous hydrogen peroxide solution and an aqueous soda solution are sprayed into a fluidised bed comprising sodium percarbonate particles, b) application of an inner coating layer onto the core material from step a) by spraying an aqueous solution, in which at least one hydrate-forming, inorganic salt is dissolved and c) application of an outer coating layer onto the coated material from step b) by spraying an aqueous mixture in which at least one surfactant is dissolved or emulsified, which contains in the molecule one or more sulfate or sulfonate groups in the form of an alkali metal, alkaline-earth metal or ammonium salt.

Production of the core material from hydrogen peroxide and soda takes place by known means by the fluidised bed spray granulation method and preferably by the method described in EP-A 0 716 640. Here hydrogen peroxide and sodium carbonate solution are preferably reacted in a molar ratio of $H_2O_2$ to $Na_2CO_3$ of 1.4 to 1.7, particularly preferably 1.5 to 1.65. Hydrogen peroxide is used as an aqueous solution with preferably 30 to 75 wt. % $H_2O_2$, particularly preferably 40 to 70 wt. % $H_2O_2$. The hydrogen peroxide solution can additionally contain stabilising additives, such as e.g. complexing agents or magnesium compounds. Sodium carbonate is preferably used as an aqueous solution with a concentration of between 10 wt. % sodium carbonate and the saturation concentration of sodium carbonate, particularly preferably between 20 wt. % sodium carbonate and the saturation concentration of sodium carbonate. The sodium carbonate solution can likewise contain stabilising additives, such as e.g. water glass. In the fluidised bed spray granulation process the water introduced with the feed materials is evaporated and removed by feeding a drying gas into the fluidised bed. Air or a combustion gas obtained by burning a fuel such as e.g. natural gas with air is preferably used as the drying gas. The drying gas is preferably supplied to the fluidised bed at a temperature of between 120 and 400° C., particularly preferably between 200 and 400° C. The temperature in the fluidised bed is preferably kept at between 40 and 95° C., particularly between 40 and 80° C. and in particular between 50 and 70° C.

In a preferred embodiment, nucleus material is supplied to the fluidised bed in a quantity that leads to the formation of granules having an average particle size in the range from 0.2 to 2 mm. The core material is preferably discharged from the fluidised bed by a classifying process, and particularly preferably by the process described in EP-A 0 938 922, such that preferably more than 90 wt. % of the core material particles discharged from the fluidised bed display a diameter of over 0.2 mm.

The inner coating layer is applied by spraying an aqueous solution in which at least one hydrate-forming, inorganic salt is dissolved. The inner coating layer is preferably applied by spraying an aqueous sodium sulfate solution. The bulk of the water contained within the aqueous solution is preferably evaporated by the input of heat as it is being sprayed, such that during the application of the inner coating layer only a small part of the core material begins to dissolve again and a solid coating layer is already formed from the hydrate-forming, inorganic salt during the spraying process. The inner coating layer is preferably applied by spraying the aqueous solution of the hydrate-forming, inorganic salt in a fluidised bed and particularly preferably by the process described in EP-A 0 970 917, with which a dense coating layer can be achieved even with small amounts of coating layer material. Application of the inner coating layer in a fluidised bed preferably takes place with the supply of a drying gas to the fluidised bed, such that a temperature in the range from 30 to 90° C. is established in the fluidised bed.

Application of the outer coating layer by the process according to the invention is performed by spraying an aqueous mixture containing at least one surfactant which contains in the molecule one or more sulfate or sulfonate groups in the form of an alkali metal, alkaline-earth or ammonium salt, onto the granules coated with an inner coating layer. The aforementioned alkyl benzene sulfonates, alkyl sulfonates, α-olefin sulfonates, sulfosuccinates, alkyl sulfates and ether sulfates are preferably used as surfactants, either alone or in blends. The surfactants or surfactant blends can be sprayed both as aqueous solutions and as aqueous emulsions. Solid surfactants that are poorly soluble in water can be converted into sprayable aqueous emulsions by heating them above their melting point, by adding an auxiliary surfactant, or by a combination of these two measures, in the presence of water. During the application of the outer coating layer, the bulk of the water contained within the aqueous surfactant blend is preferably evaporated by the input of heat as the aqueous blend is being sprayed, such that during the application of the outer coating layer only a small part of the inner coating layer begins to dissolve again and a solid or waxy, surfactant-containing outer coating layer is formed as the outer coating layer is applied. The outer coating layer is preferably applied by spraying the aqueous surfactant blend in a fluidised bed in which the material coated with the inner coating layer has been placed. The outer coating layer is particularly preferably applied by the process described in EP-A 0 970 917, with which dense outer coating layers can be achieved even with small amounts of surfactant. During application of the outer coating layer by spraying the aqueous surfactant blend in a fluidised bed, a drying gas is preferably supplied to the fluidised bed such that a temperature in the range from 30 to 90° C. is established in the fluidised bed.

In a preferred embodiment corresponding to WO 02/051745, the process according to the invention for producing coated sodium percarbonate granules includes an additional step of thermal aftertreatment at a temperature of 70 to 120° C., preferably 80 to 95° C., for a period of at least 2 minutes, preferably 5 to 60 minutes, which is performed after step a), production of the core material by fluidised bed spray granulation. The thermal aftertreatment is preferably performed after step b), application of an inner coating layer, and particularly preferably after step c), application of the outer coating layer.

The invention also additionally provides the use of the coated sodium percarbonate granules according to the invention, or of the coated sodium percarbonate granules produced by the process according to the invention, as bleaching agents and as active bleaching components in detergents and cleaning agents.

The invention also provides bleaching agents having improved storage stability, which contain 15 to 99 wt. % of the coated sodium percarbonate granules according to the invention or of the sodium percarbonate granules produced by the process according to the invention.

The invention likewise provides detergents and cleaning agents having improved storage stability, which contain 1 to 40 wt. % of the coated sodium percarbonate granules according to the invention or of the coated sodium percarbonate granules produced by the process according to the invention.

The coated sodium percarbonate granules according to the invention and the coated sodium percarbonate granules produced by the process according to the invention display improved storage stability in detergents and cleaning agents. In commercial, zeolite-containing detergent blends, which are stored in commercial detergent packs, the coated sodium percarbonate granules according to the invention display an active oxygen loss of less than 20% when stored at 35° C. and 80% relative humidity for a period of 8 weeks, in other words the residual active oxygen after storage for eight weeks is over 80% of the original amount of active oxygen.

The coated sodium percarbonate granules according to the invention and the coated sodium percarbonate granules produced by the process according to the invention also display a high internal stability, i.e. when stored in bulk they display only a low release of heat through decomposition reaction. After storage for 48 hours at 40° C. the amount of heat released by the coated sodium percarbonate granules according to the invention, measured by the TAM method, is less than 5 µW/g and preferably less than 3 µW/g. Determination of the heat release by the TAM method is performed by microcalorimetry using a thermal activity monitor supplied by Thermometric AB, Järfälla (SE) over a 48 hour storage period in a measuring cell at 40° C.

High storage stability combined with high internal stability can be achieved in the coated sodium percarbonate granules according to the invention even with small quantities of coating agents and additives. The coated sodium percarbonate granules according to the invention thus display a high content of sodium percarbonate and as a consequence a high active oxygen content. The active oxygen content, determined by redox titration of the hydrogen peroxide released after dissolving the granules in water, is preferably more than 13.0 wt. % and is particularly preferably at least 13.5 wt. %.

Coated sodium percarbonate granules according to the invention displaying no other coating layers in addition to the inner and outer coating layer, exhibit short dissolving times when the granules are dissolved in water. For these sodium percarbonate granules coated according to the invention the times to dissolve 95% of the granules in water at 15° C., determined by conductometry, are less than 50% longer than the times to dissolve non-coated sodium percarbonate core materials.

By contrast, coated sodium percarbonate granules according to the invention displaying an additional coating layer which contains as its main component an alkali metal silicate having a modulus of over 2.5, exhibit a delayed dissolution in water, with dissolving times of preferably more than 5 minutes, particularly preferably more than 10 minutes. The granules having delayed dissolution display advantages when used in detergents and cleaning agents containing oxidation-sensitive enzymes. Through the delayed dissolution of the granules, the enzymes can act over a longer period of time before they are deactivated by the released active oxygen use.

EXAMPLES a) Determining the dissolving time:

2 g of non-coated or coated sodium percarbonate are stirred into 1 l water at 15° C. The dissolving time is defined as the time at which 95% is dissolved; this is determined by conductometry. To compare the dissolving time of two differently produced/coated products, they must display a comparable grain size; if necessary, narrow screen fractions are compared with one another.

b) Determining the storage stability in detergent blends:

A phosphate-free but zeolite-containing detergent powder, TAED activator and the coated sodium percarbonate are mixed together in a quantity such that the mixture contains 5% TAED and the active oxygen content is around 2.35 wt. %.

Components of the detergent powder in wt. %:

| | |
|---|---|
| Anionic surfactants | 12 |
| Non-ionic surfactants | 8 |
| Zeolite A | 36 |
| Soda | 10 |
| Sodium silicates | 3 |
| Remainder including moisture | 31 |

800 g of each mixture are stored in commercial E1 detergent packs, impregnated to be water-repellent and sealed, in a conditioning cabinet at 35° C. and 80% relative humidity. The active oxygen content is determined in the conventional way by permanganometry. The retained active oxygen content is determined as a percentage from the initial active oxygen content and the active oxygen content after 8 weeks.

Comparative Example

Using the process described in EP-B 0 716 640, sodium percarbonate granules, having an average particle diameter of 0.75 mm and a proportion of fines under 0.2 mm of less than 2%, were produced from an aqueous hydrogen peroxide solution and an aqueous soda solution by fluidised bed spray granulation at a fluidised bed temperature of 50 to 70° C.

The granules were coated with a sodium sulfate layer by the process described in EP-B 0 863 842 in section [0021] by spraying a 20 wt. % sodium sulfate solution in a fluidised bed at a fluidised bed temperature of 50 to 70° C. The amount of sodium sulfate solution was chosen such that 6 wt. % sodium sulfate, relative to the amount of granules used, was applied.

The sodium percarbonate granules coated with sodium sulfate displayed an active oxygen content of 13.7 wt. %. In the TAM measurement the granules displayed a release of heat of 2.2 µW/g after 48 hours at 40° C. The dissolving time of the granules at 15° C. in water was determined as 1.5 minutes.

After storage in a detergent blend for eight weeks at 35° C. and 80% relative humidity the residual content of active oxygen was 67% of the original amount.

Example 1000 g of the sodium sulfate-coated sodium percarbonate granules produced in the comparative example were placed in a Strea-1 laboratory coater supplied by Aeromatic and held in a fluidised bed with fluidising air at 70° C. A 2 wt. % aqueous solution of sodium dodecyl benzene sulfonate (Lutensit A-LBN from BASF) was sprayed through a two-component nozzle into the fluidised bed. The amount of surfactant solution was chosen such that 2 wt. % surfactant, relative to the amount of granules used, was applied. Following spraying of the surfactant solution, the granules were dried in the fluidised bed for a further 30 minutes at 70° C.

The sodium percarbonate granules coated according to the invention that were obtained had an active oxygen content of 13.6 wt. %. In the TAM measurement the granules displayed a release of heat of 2.1 µW/g after 48 hours at 40° C. The dissolving time of the granules at 15° C. in water was determined as 1.5 minutes.

After storage in a detergent blend for eight weeks at 35° C. and 80% relative humidity, the residual content of active oxygen was 88% of the original amount.

What is claimed is:

1. A coated sodium percarbonate granule with improved storage stability, comprising:
    a) a core produced by fluidised bed spray granulation comprising sodium percarbonate as its main component;
    b) an inner coating layer comprising an inorganic hydrate-forming salt as its main component; and
    c) an outer coating layer comprising as its main component at least one surfactant, wherein said surfactant comprises one or more sulfate or sulfonate groups in the form of an alkali metal, alkaline-earth metal or ammonium salt.

2. The sodium percarbonate granule of claim 1, wherein said core comprises 80-99.5 wt % of said granule.

3. The sodium percarbonate granule of claim 1, wherein said sodium percarbonate comprises greater than 80% of the weight of said core.

4. The sodium percarbonate granule of claim 1, wherein organic carbon compounds comprise less than 1 wt % of said core.

5. The sodium percarbonate granule of claim 1, wherein said core further comprises 0.1 to 1 wt % of an alkali metal silicate.

6. The sodium percarbonate granule of claim 1, wherein said core comprises 50-2000 ppm $Mg^{2+}$.

7. The sodium percarbonate granule of claim 1, wherein said inner coating layer comprises 1 to 10 wt % of said granule.

8. The sodium percarbonate granule of claim 1, wherein said inorganic, hydrate-forming salt comprises at least 50 wt % of said inner coating layer.

9. The sodium percarbonate granule of claim 1, wherein said inorganic, hydrate-forming salt in said inner coating layer is selected from the group consisting of: sodium sulfate; sodium carbonate; sodium hydrogen carbonate; magnesium sulfate; and mixtures or mixed salts of these compounds.

10. The sodium percarbonate granule of claim 9, wherein said inorganic, hydrate-forming salt is sodium sulfate.

11. The sodium percarbonate granule of claim 1, wherein said outer coating layer comprises 0.1-10 wt. % of said granule.

12. The sodium percarbonate granule of claim 1, wherein said surfactant comprises at least 50 wt % of said outer coating layer.

13. The sodium percarbonate granule of claim 12, wherein said outer coating layer comprises a blend of surfactants and wherein at least 50% of said surfactants in said blend comprise one or more sulfate or sulfonate groups in the form of an alkali metal, alkaline metal or ammonium salt.

14. The sodium percarbonate granule of claim 1, wherein said sulfate or sulfonate groups in said surfactant are in the form of a sodium salt.

15. The sodium percarbonate granule of claim 1, further comprising an additional coating layer, wherein said additional coating layer covers said inner coating layer and comprises, as its main component, an alkali metal silicate having a modulus of $SiO_2$ to alkali metal oxide of over 2.5.

16. The sodium percarbonate granule of claim 15, wherein said additional coating layer comprises 0.2-3 wt % of said granule.

17. A composition comprising sodium percarbonate granules according to claim 1, wherein the average particle size $d_{50}$ is in the range of 0.3 to 2 mm.

18. A composition comprising sodium percarbonate granules according to claim 1, wherein more than 90 wt % of said granules have a diameter of more than 0.2 mm.

19. A process for the production of coated sodium percarbonate granules with improved storage stability, comprising:
    a) producing a core by fluidised bed spray granulation, wherein an aqueous hydrogen peroxide solution and an aqueous soda solution are sprayed into a fluidised bed comprising sodium percarbonate particles;
    b) applying an inner coating layer onto the core of step a) by spraying an aqueous solution in which at least one hydrate-forming inorganic salt is dissolved; and
    c) applying an outer coating layer onto the coated core of step b) by spraying an aqueous mixture in which at least one surfactant is dissolved or emulsified and wherein said surfactant comprises one or more sulfate or sulfonate groups in the form of an alkali metal, alkaline-earth metal or ammonium salt.

20. The process of claim 19, wherein said hydrate-forming inorganic salt in step b) is sodium sulfate.

21. The process of claim 19, wherein said inner coating layer and said outer coating layer are applied by spraying in a fluidised bed.

22. The process of claim 21, wherein said inner coating layer and said outer coating layer are applied at a temperature in the range of 30-90° C.

23. A composition for bleaching or cleaning, wherein said composition comprises sodium percarbonate granules according to claim 1.

24. The composition of claim 23, wherein said composition is a bleaching agent and comprises 15-99 wt % of said sodium percarbonate granules.

25. The composition of claim 22, wherein said composition is a detergent or cleaning agent and comprises 1-40 wt % of said sodium percarbonate granules.

* * * * *

UNITED STATES PATENT AND TRADEMARK OFFICE
CERTIFICATE OF CORRECTION

| | | |
|---|---|---|
| PATENT NO. | : 7,588,697 B2 | Page 1 of 1 |
| APPLICATION NO. | : 10/555546 | |
| DATED | : September 15, 2009 | |
| INVENTOR(S) | : Zimmerman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Twenty-eighth Day of September, 2010

David J. Kappos
*Director of the United States Patent and Trademark Office*